(12) United States Patent
Chang et al.

(10) Patent No.: US 9,052,921 B2
(45) Date of Patent: Jun. 9, 2015

(54) UNIVERSAL SERIAL BUS NETWORK INTERFACE CONTROLLER AND OPERATION MODE SWITCHING METHOD

(71) Applicant: REALTEK SEMICONDUCTOR CORPORATION, Hsinchu (TW)

(72) Inventors: Chun-Chu Chang, Taichung (TW); Kuang-Yu Yen, Taichung (TW); Jia-Ching Shen, Taipei (TW); Yu-Chen Liu, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/231,882

(22) Filed: Apr. 1, 2014

(65) Prior Publication Data

US 2014/0297899 A1   Oct. 2, 2014

(30) Foreign Application Priority Data

Apr. 2, 2013 (TW) .............................. 102111810 A

(51) Int. Cl.
| | |
|---|---|
| G06F 3/06 | (2006.01) |
| G06F 9/44 | (2006.01) |
| G06F 13/38 | (2006.01) |
| H04W 48/20 | (2009.01) |
| G06F 13/00 | (2006.01) |

(52) U.S. Cl.
CPC ............ *G06F 9/4413* (2013.01); *G06F 13/387* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 6,169,789 B1 | 1/2001 | Rao et al. | |
| 2013/0028152 A1* | 1/2013 | Kim et al. | ..................... 370/310 |
| 2014/0098247 A1* | 4/2014 | Rao et al. | ................... 348/207.1 |

* cited by examiner

*Primary Examiner* — Scott Sun
(74) *Attorney, Agent, or Firm* — Christensen Fonder P.A.

(57) ABSTRACT

A universal serial bus (USB) network interface controller and an operation mode switching method thereof are provided. The USB network interface controller determines an access point network band of a wireless network access point with which the USB network interface controller intends to connect, and switches from a first USB operation mode to a second USB operation mode to transmit data with a host so that an operation frequency of the USB network interface controller falls outside the access point network band. Afterwards, the USB network interface controller adjusts an operation network band to be the same as the access point network band, and exchanges information with the wireless network access point.

19 Claims, 3 Drawing Sheets

UNIVERSAL SERIAL BUS NETWORK INTERFACE CONTROLLER AND OPERATION MODE SWITCHING METHOD

This application claims priority to Taiwan Patent Application No. 102111810 filed on Apr. 2, 2013, which is hereby incorporated by reference in its entirety.

CROSS-REFERENCES TO RELATED APPLICATIONS

Not applicable.

BACKGROUND OF THE INVENTION

1. Field of the Invention

The present invention relates to a universal serial bus (USB) network interface controller and an operation mode switching method thereof. More particularly, the USB network interface controller and the operation mode switching method thereof according to the present invention can switch between different modes of USB transmission with a host when different wireless network access points are connected.

2. Descriptions of the Related Art

The universal serial bus (USB) input/output (I/O) interfaces have the advantages of supporting Hot-Plug and Plug-n-Play and having a high transmission speed, so they have been widely used in various computer peripheral devices. One of the common applications of the USB I/O interfaces is the USB wireless network controller card. Specifically, the USB wireless network controller card connects with a computer host mainly via a USB I/O interface and transmits data between the computer host and an external wireless network access point via the USB I/O interface.

Most of wireless network transmission specifications (e.g., 802.11a/b/g/n) commonly used at present transmit data in units of Mbps (mega bits per second), so USB wireless network controller cards adopting the USB 2.0 specification (with a maximum data rate of 480 Mbps) for data transmission with a computer host can substantially satisfy the needs for the data transmission rate between wireless networks and computer hosts in most cases.

However, with advancement of the wireless network technologies, high-speed wireless network transmission specifications (e.g., 802.11ac) that transmit data in units of Gbps (giga bit per second) have come into being. In this case, when a wireless network controller card adopting the USB 2.0 specification for connection with a computer host connects to a high-speed wireless network, data received by the USB wireless network controller card from the high-speed wireless network cannot be transmitted to the computer host timely because the maximum data rate of USB. 2.0 is only 480 Mbps. This leads to a bottleneck in data transmission between the high-speed wireless network and the computer host. As a primary solution to this problem, the USB 3.0 specification allowing for a maximum data rate of 5 Gbps has been introduced in some wireless network controller cards for data transmission with the computer host.

However, for USB wireless network controller cards that adopt the USB 3.0 specification for data transmission with the computer host, because the USB 3.0 specification operates at an operation frequency of 2.5 GHz, so the radiation and signal coupling caused during physical transferring of data signals in the buses will cause serious interference to wireless networks (e.g., 802.11b/g/n) that use frequency bands around 2.4-2.5 GHz for data transmission. Consequently, it is impossible to effectively accomplish the data transmission between the wireless network and the computer host when a USB wireless network controller card adopting the USB 3.0 specification is used.

Accordingly, an urgent need exists in the art to provide a solution that allows a USB wireless network controller card to effectively accomplish data transmission between different wireless networks and computer hosts but still with reduced signal interferes so as to improve flexibility in use of the USB wireless network controller card.

SUMMARY OF THE INVENTION

To solve the aforesaid technical problem, the present invention provides a USB network interface controller and an operation mode switching method thereof, which can determine a network band used by a wireless network access point connected with the USB network interface controller and determine therefrom a USB transmission specification to be used between the USB network interface controller and a computer host.

To achieve the aforesaid objective, the present invention provides an operation mode switching method for use in a universal serial bus (USB) network interface controller. The USB network interface controller is connected with a host. The operation mode switching method comprises the following steps of: searching a wireless network access point within a communication range; determining that the wireless network access point operates within an access point network band; switching a data transmission mode from a first USB operation mode to a second USB operation mode, and performing data transmission with the host in the second USB operation mode, wherein an operation frequency of the second USB operation mode falls outside the access point network band; adjusting an operation network band to the access point network band, and performing connection and data transmission with the wireless network access point within the operation network band.

To achieve the aforesaid objective, the present invention further provides a universal serial bus (USB) network interface controller. The USB network interface controller is connected with a host and comprises a transceiver, a processor and a USB transmission mode switching unit. The transceiver is configured to search a wireless network access point within a communication range. The processor is configured to determine that the wireless network access point operates within an access point network band. The USB transmission mode switching unit is configured to switch a data transmission mode of the USB network interface controller from a first USB operation mode to a second USB operation mode and transmit data with the host in the second USB operation mode. An operation frequency of the second USB operation mode falls outside the access point network band. The processor is further configured to adjust an operation network band to the access point network band. The transceiver is configured to connect and transmit data with the wireless network access point within the operation network band.

With the technical features disclosed above, the USB network interface controller and the operation mode switching method thereof according to the present invention can determine a network band used by a wireless network access point connected with the USB network interface controller and determine therefrom a USB transmission specification to be used between the USB network interface controller and a computer host so as to avoid possible signal interferences.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration but not to limit the present invention. It should be appreciated that, in the following embodiments and attached drawings, elements unrelated to the present invention are omitted from depiction.

Figure 1A:
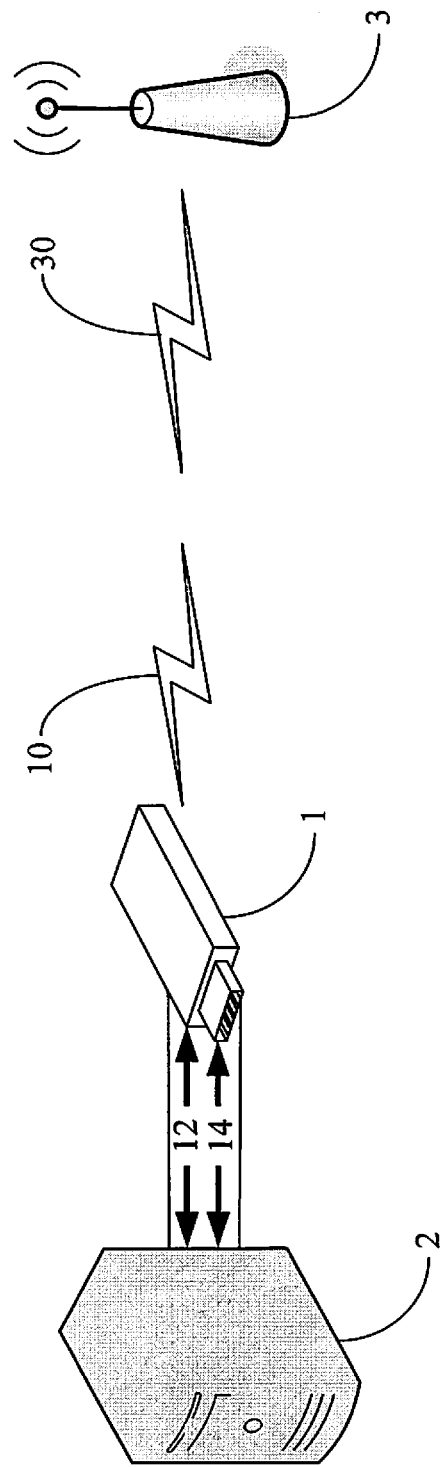
FIG. 1A is a schematic view illustrating network connection relationships for a USB network interface controller according to a first embodiment of the present invention.
Figure 1B:
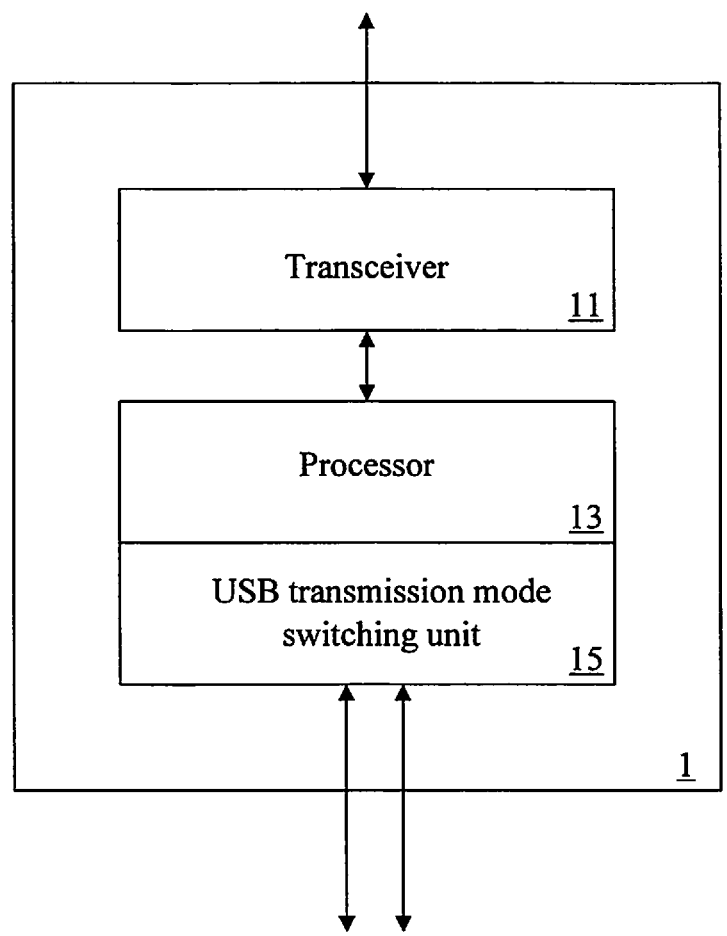
FIG. 1B is a schematic view of the USB network interface controller according to the first embodiment of the present invention.

Referring to FIGS. 1A-1B together, FIG. 1A is a schematic view illustrating network connection relationships for a universal serial bus (USB) network interface controller 1 according to a first embodiment of the present invention, and FIG. 1B is a schematic view of the USB network interface controller 1 according to the first embodiment of the present invention. The USB network interface controller 1 comprises a transceiver 11, a processor 13 and a USB transmission mode switching unit 15. The USB network interface controller 1 is connected with a computer host 2. As will be readily appreciated by those skilled in the art, the transceiver 11 may be a combination of an antenna and a communication circuit, the processor 13 may be a general processor, and the USB transmission mode switching unit 15 may be a circuit for controlling a USB transmission mode, so no further description will be made thereon. Interactions between individual elements will be further described hereinbelow.

Firstly, the USB network interface controller 1 searches a wireless network access point with which the USB network interface controller 1 can connect within a communication range and then determines a frequency band of the wireless network access point. Specifically, in the first embodiment, the transceiver 11 of the USB network interface controller 1 finds a wireless network access point 3. Then the processor 13 of the USB network interface controller 1 can determine a communication protocol (e.g., 802.11a/b/g/n/ac) to be used for establishing a connection between the USB network interface controller 1 and the wireless network access point 3, and further determine an access point network band 30 within which the wireless network access point 3 operates (e.g., the network band for 802.11a is within 5-5.875 GHz, the network band for 802.11b/g is within 2.4-2.5 GHz, the network band for 802.11n is 2.4 GHz or 5 GHz, and the network band for 802.11ac is 5 GHz) according to the communication protocol between the USB network interface controller 1 and the wireless network access point 3.

In order to avoid a bus frequency between the USB network interface controller 1 and the host 2 from interfering with network signals, the transmission mode used between the USB network interface controller 1 and the host 2 needs to be adjusted correspondingly. In detail, after the USB network interface controller 1 has determined the access point network band 30 within which the wireless network access point 3 operates via the processor 13, the USB transmission mode switching unit 15 of the USB network interface controller 1 switches a data transmission mode of the USB network interface controller 1 from a first USB operation mode 12 to a second USB operation mode 14 according to the access point network band 30. The processor 13 then transmits data from and to the computer host 2 in the second USB operation mode 14.

An operation frequency of the second USB operation mode 14 falls outside the access point network band 30. Thus, the operation frequency of the USB bus will not interfere with data transmission between the USB network interface controller 1 and the wireless network access point 3. It should be appreciated that, the aforesaid embodiment is provided to illustrate that if the operation frequency of the first USB operation mode 12 causes greater interferences to network signals (i.e., as compared to the operation frequency of the second USB operation mode 14, the operation frequency of the first USB operation mode 12 is closer to or falls within the access point network band 30), then the USB network interface controller 1 switches to the second USB operation mode 14; and if the operation frequency of the first USB operation mode 12 causes no interferences to the network signals (i.e., the operation frequency of the first USB operation mode 12 falls outside the access point network band 30; that is, the operation frequency of the first USB operation mode is away from the access point network band 30 without interfering with network signals that are within the access point network band 30), then the data transmission mode can be maintained to be the first USB operation mode 12.

Then, the processor 13 of the USB network interface controller 1 adjusts an operation network band 10 of the USB network interface controller 1 to the access point network band 30 of the wireless network access point 3. In this way, the USB network interface controller 1 can transmit data with the wireless network access point 3 via the transceiver 11 within the operation network band 10 that is immune to interferences caused by the USB bus operation frequency.

For example, when the wireless network access point is a very high throughput network access point conforming to the 802.11ac standard, the access point network band thereof is within 5 GHz. Then, the USB network interface controller can switch from the USB 2.0 operation mode to the USB 3.0 operation mode which corresponds to an operation frequency of 2.4 GHz falling outside the operation network band of 5 GHz, and adjust the operation network band to 5 GHz. In this way, a high demand for data transmission between the computer host and the wireless network access point can be satisfied and the operation frequency of the USB bus will not interfere with the network band used between the computer host and the wireless network access point.

Alternatively, when the wireless network access point is a wireless network access point conforming to the 802.11b/g/n standard, the access point network band thereof is within 2.4-2.5 GHz. Then, if the USB network interface controller transmits data with the computer host by using the USB 3.0 specification which has a bus operation frequency falling at 2.5 GHz, then interferences to the wireless network access point may occur. Accordingly, the USB network interface controller can switch from the USB 3.0 operation mode to the USB 2.0 operation mode to reduce the interferences to data transmission of the wireless network. At the same time, the transmission rate of the USB 2.0 specification can also satisfy the network data rate standard of the 802.11b/g/n. The operation network band of the USB network interface controller is also adjusted to 2.4-2.5 GHz so that data can be exchanged with the wireless network access point.

Similarly, when the wireless network access point is a wireless network access point conforming to the 802.11a/n standard, the access point network band thereof is within 4.9-6.0 GHz. Then, the operation network band of the USB network interface controller is also adjusted to 4.9-6.0 GHz so that data can be exchanged with the wireless network access point. Then, because the USB 2.0 specification and the USB 3.0 specification both have bus operation frequencies falling outside 4.9-6.0 GHz, the USB network interface controller can switch between the USB 2.0 specification and the USB 3.0 specification optionally depending on the network bandwidth conditions and transmit data with the computer host according to the USB specification.

Figure 2:
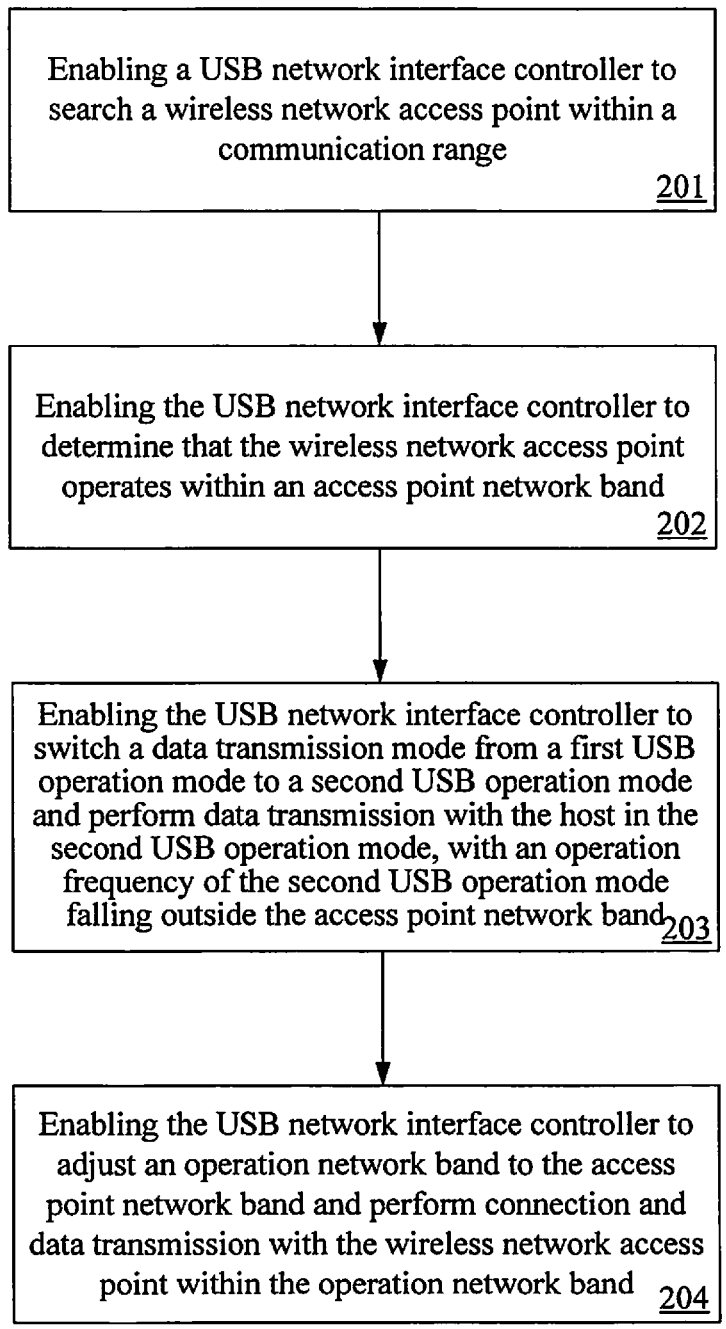
FIG. 2 is a flowchart diagram of an operation mode switching method according to a second embodiment of the present invention.

Further referring to FIG. 2, it is a flowchart diagram of an operation mode switching method according to a second embodiment of the present invention. The method of the second embodiment is for use in a USB network interface controller (e.g., the USB network interface controller of the aforesaid embodiment), which is connected with a computer host. The operation mode switching method of the second embodiment is executed by the USB network interface controller. Steps of the method will be detailed as follows.

Firstly, step 201 is executed to search a wireless network access point with which the USB network interface controller can connect within a communication range. Then, step 202 is executed to determine that the wireless network access point operates within an access point network band. Similarly, the USB network interface controller can further determine a corresponding network band mainly by determining a network specification (e.g., the 802. 11a/b/g/n) used by the wireless network access point.

Subsequently, step 203 is executed to switch a data transmission mode between the USB network interface controller and the computer host from a first USB operation mode to a second USB operation mode, and perform data transmission with the computer host in the second USB operation mode. An operation frequency of the second USB operation mode falls outside the access point network band.

In this way, the connection between the USB network interface controller and the wireless network access point can operate normally free from interferences caused by the operation frequency of the bus between the USB network interface controller and the computer host. Likewise, if the operation frequency of the first USB operation mode causes no interference to network signals (i.e., the operation frequency of the first USB operation mode falls outside the access point network frequency), then the data transmission mode can be maintained to be the first USB operation mode.

Finally, step 204 is executed to adjust an operation network band to the access point network band and perform connection and data transmission with the wireless network access point within the operation network band. In this way, the USB network interface controller can transmit data with the wireless network access point within the operation network band that is immune to interferences caused by the USB bus operation frequency.

It should be appreciated that, the process of the operation mode switching method according to the second embodiment of the present invention can be repeated. In other words, when the USB network interface controller re-establishes a connection with a different wireless network access point, the aforesaid steps can be repeated to make the best use of the USB network interface controller. In addition, the operation mode switching method according to the second embodiment of the present invention may also be similarly used in the circumstances illustrated in the first embodiment, which will not be further described herein.

According to the above descriptions, the USB network interface controller and the operation mode switching method thereof according to the present invention can determine the network band used by the wireless network access point connected with the USB network interface controller and determine therefrom the USB transmission specification to be used between the USB network interface controller and the computer host. Therefore, interferences that are possibly caused to the network signals by the frequency of the bus between the USB network interface controller and the computer host can be avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An operation mode switching method for use in a network interface device, the network interface device being coupled to a host, the operation mode switching method comprising the following steps of:
    searching a wireless network access point within a communication range;
    determining that the wireless network access point operates within an access point network band; and
    determining to perform data transmission between the host and the network interface device in a second operation mode when an operation frequency of a first operation mode interferes with the access point network band.

2. The operation mode switching method as claimed in claim 1, wherein the first operation mode is USB 3.0 operation mode, and the second operation mode is non-USB 3.0 operation mode.

3. The operation mode switching method as claimed in claim 1, wherein the access point network band is within 2.4-2.5 GHz, the first operation mode is USB 3.0 operation mode.

4. The operation mode switching method as claimed in claim 1, wherein the access point network band is within 4.9-6.0 GHz, and the network interface device operates either in the first operation mode or in the second operation mode.

5. A network interface device which couples to a host, comprising:
    a transceiver, being configured to search a wireless network access point within a communication range;
    a processor, being configured to determine that the wireless network access point operates within an access point network band; and
    a transmission mode switching unit;
    wherein the network interface device has a first operation mode and a second operation mode, and the network interface device communicates with the host in the second operation mode when the operation frequency of the first operation mode interferes with the access point network band, and wherein the processor is further configured to adjust an operation network band to the access point network band.

6. The network interface device as claimed in claim 5, wherein the first operation mode is USB 3.0 operation mode, and the second operation mode is non-USB 3.0 operation mode.

7. The network interface device as claimed in claim 5, wherein the access point network band is within 2.4-2.5 GHz, and the first operation mode is USB 3.0 operation mode.

8. The network interface device as claimed in claim 5, wherein the access point network band is within 4.9-6.0 GHz and the network interface device operates either in the first operation mode or in the second operation mode.

9. An operation mode switching method for use in a network interface device, the network interface device performing data transmission with a host in a first operation mode or a second operation mode, and the network interface device performing wireless data transmission in a first band or a second band, the operation mode switching method comprising the following steps of:

performing wireless data transmission with a wireless network device in one of the first operation band and the second operation band; and determining to perform data transmission with the host in one of the first operation mode and the second operation mode according to the operation band in which the network interface device performs wireless data transmission with the wireless network device to reduce an interference to the wireless data transmission.

10. The operation mode switching method as claimed in claim 9, wherein when the operation band in which the wireless network device performs the wireless data transmission is within 4.9-6.0 GHz, the network interface device performs the data transmission with the host in either of the first operation mode or the second operation mode.

11. The operation mode switching method as claimed in claim 9, wherein the first operation mode and the second operation mode are USB 3.0 operation mode and non USB 3.0 operation mode respectively, and when the operation band in which the wireless network device performs the wireless data transmission is within 2.4-2.5 GHz, the network interface device performs the data transmission with the host in the non USB 3.0 operation mode.

12. The operation mode switching method as claimed in claim 11, wherein the non USB 3.0 operation mode is USB 2.0 operation mode.

13. A network interface device, comprising:

a wireless transceiver, being configured to perform wireless data transmission in a first band or a second band;

a transmission mode switching unit, having a first data transmission mode and a second data transmission mode, and being configured to switch to the first data transmission mode and the second data transmission mode for data transmission; and a processor electrically coupled to the wireless transceiver and the transmission mode switching unit, being configured to control the transmission mode switching unit to switch between the first data transmission mode and the second data transmission mode according to whether the wireless transceiver operates in the first band or the second band to reduce an interference to the wireless data transmission.

14. The network interface device as claimed in claim 13, wherein the first band is within 4.9-6.0 GHz, and the second band is within 2.4-2.5 GHz.

15. The network interface device as claimed in claim 13, wherein when the wireless transceiver performs wireless data transmission within 4.9-6.0 GHz, the transmission mode switching unit performs data transmission in either of the first data transmission mode and the second data transmission mode.

16. The network interface device as claimed in claim 13, wherein when the wireless transceiver performs the wireless data transmission within 2.4-2.5 GHz, the transmission mode switching unit performs the data transmission in a non-USB 3.0 operation mode.

17. The network interface device as claimed in claim 13, wherein an operation frequency of the first operation mode is different from that of the second operation mode, and the interference caused by the operation frequency of the first operation mode and the interference caused by the operation frequency of the second operation mode are different.

18. An operation mode switching method for use in a network interface device, the network interface device performing transmission with a host in a first operation mode or a second operation mode, the operation mode switching method comprising the following steps of:

searching a wireless network device within a communication range;

determining that the wireless network device operates within an operation band; and deciding to perform transmission with the host in the first operation mode or the second operation mode according to the operation band to reduce an interference to communication between the network interface device and the wireless network device, wherein an operation frequency of the first operation mode is different from that of the second operation mode.

19. The operation mode switching method as claimed in claim 18, wherein the interference caused by the operation frequency of the first operation mode and the interference caused by the operation frequency of the second operation mode are different.

* * * * *